US010900097B2

(12) United States Patent
Kim et al.

(10) Patent No.: US 10,900,097 B2
(45) Date of Patent: Jan. 26, 2021

(54) HIGH-STRENGTH HOT-DIP GALVANIZED STEEL SHEET HAVING EXCELLENT SURFACE QUALITY AND SPOT WELDABILITY

(71) Applicant: POSCO, Pohang-si (KR)

(72) Inventors: Myung-Soo Kim, Gwangyang-si (KR); Ki-Cheol Kang, Gwangyang-si (KR); Il-Jeong Park, Gwangyang-si (KR)

(73) Assignee: POSCO, Pohang-si (KR)

( * ) Notice: Subject to any disclaimer, the term of this patent is extended or adjusted under 35 U.S.C. 154(b) by 281 days.

(21) Appl. No.: 16/060,208

(22) PCT Filed: Dec. 13, 2016

(86) PCT No.: PCT/KR2016/014607
§ 371 (c)(1),
(2) Date: Jun. 7, 2018

(87) PCT Pub. No.: WO2017/105064
PCT Pub. Date: Jun. 22, 2017

(65) Prior Publication Data
US 2018/0371570 A1    Dec. 27, 2018

(30) Foreign Application Priority Data

Dec. 15, 2015  (KR) .................. 10-2015-0179185

(51) Int. Cl.
*C22C 38/28* (2006.01)
*C22C 38/38* (2006.01)
(Continued)

(52) U.S. Cl.
CPC .......... *C21D 8/0273* (2013.01); *B32B 15/013* (2013.01); *B32B 15/04* (2013.01); *B32B 15/043* (2013.01); *B32B 15/18* (2013.01); *C21D 1/76* (2013.01); *C21D 6/004* (2013.01); *C21D 6/005* (2013.01); *C21D 6/008* (2013.01); *C21D 8/02* (2013.01); *C21D 9/46* (2013.01); *C22C 38/00* (2013.01); *C22C 38/001* (2013.01); *C22C 38/02* (2013.01); *C22C 38/04* (2013.01); *C22C 38/06* (2013.01); *C22C 38/12* (2013.01); *C22C 38/14* (2013.01); *C22C 38/18* (2013.01); *C22C 38/22* (2013.01); *C22C 38/26* (2013.01); *C22C 38/28* (2013.01); *C22C 38/32* (2013.01); *C22C 38/34* (2013.01); *C22C 38/38* (2013.01);
(Continued)

(58) Field of Classification Search
CPC .......... C21D 1/76; C21D 9/46; C21D 8/0273; C21D 8/02; C21D 6/008; C21D 6/004; C21D 6/005; C21D 2211/001; C21D 2211/002; C21D 2211/005; C21D 2211/008; C22C 38/04; C22C 38/00; C22C 38/22; C22C 38/34; C22C 38/32; C22C 38/26; C22C 38/001; C22C 38/28; C22C 38/38; C22C 38/02; C22C 38/06; C22C 38/12; C22C 38/14; C22C 38/18; C22C 38/60; C23C 2/40; C23C 2/28; C23C 2/02; C23C 2/06; C23C 30/00; C23C 30/005; C23C 28/025; B32B 15/013; B32B 15/04; B32B 15/043; B32B 15/18; Y10T 428/12611; Y10T 428/12618; Y10T 428/1266; Y10T 428/12667; Y10T 428/12799; Y10T 428/12951; Y10T 428/12958; Y10T 428/12972; Y10T 428/12965; Y10T 428/2495; Y10T 428/24967; Y10T 428/263; Y10T 428/264; Y10T 428/265
See application file for complete search history.

(56) References Cited

U.S. PATENT DOCUMENTS

2003/0054195 A1    3/2003  Ishii et al.
2010/0186854 A1    7/2010  Bertrand et al.
(Continued)

FOREIGN PATENT DOCUMENTS

CN    103210105    7/2013
CN    103805840    5/2014
(Continued)

OTHER PUBLICATIONS

Chinese Office Action—Chinese Application No. 201680074328.5 dated Aug. 19, 2019, citing WO2015/022778, CN103805840, CN103210105, KR10-2014-0081622, WO2015/005191 and WO2015/174605.
(Continued)

*Primary Examiner* — Michael E. La Villa
(74) *Attorney, Agent, or Firm* — Cantor Colburn LLP

(57) ABSTRACT

Provided is a high-strength hot-dip galvanized steel sheet having good surface quality and spot weldability. The high-strength hot-dip galvanized steel sheet includes a base steel sheet and a zinc plating layer formed on the base steel sheet. The base steel sheet includes carbon (C): 0.1% to 0.3%, silicon (Si): 0.5% to 2.5%, manganese (Mn): 2.0% to 8.0%, soluble aluminum (sol.Al): 0.001% to 0.5%, phosphorus (P): 0.04% or less (excluding 0%), sulfur (S): 0.015% or less, nitrogen (N): 0.02% or less, chromium (Cr): 0.01% to 0.7%, titanium (Ti): (48/14)*[N] % to 0.1%, and a balance of iron (Fe) and inevitable impurities. The base steel sheet has a microstructure comprising ferrite in an area fraction of 5% to 30%, austenite in an area fraction of 5% to 20%, bainite and martensite in an area fraction of 50% to 80%, and precipitates in an area fraction of 2% or less.

4 Claims, No Drawings

(51) Int. Cl.

| | |
|---|---|
| *C22C 38/06* | (2006.01) |
| *C22C 38/02* | (2006.01) |
| *C22C 38/00* | (2006.01) |
| *C23C 2/06* | (2006.01) |
| *C23C 2/02* | (2006.01) |
| *B32B 15/01* | (2006.01) |
| *C21D 8/02* | (2006.01) |
| *C22C 38/04* | (2006.01) |
| *C22C 38/22* | (2006.01) |
| *C22C 38/34* | (2006.01) |
| *C21D 9/46* | (2006.01) |
| *C21D 6/00* | (2006.01) |
| *C23C 2/40* | (2006.01) |
| *C22C 38/32* | (2006.01) |
| *C21D 1/76* | (2006.01) |
| *C23C 2/28* | (2006.01) |
| *C22C 38/26* | (2006.01) |
| *C22C 38/14* | (2006.01) |
| *B32B 15/04* | (2006.01) |
| *C23C 30/00* | (2006.01) |
| *C23C 28/02* | (2006.01) |
| *C22C 38/60* | (2006.01) |
| *C22C 38/18* | (2006.01) |
| *C22C 38/12* | (2006.01) |
| *B32B 15/18* | (2006.01) |

(52) U.S. Cl.
CPC ............... *C22C 38/60* (2013.01); *C23C 2/02* (2013.01); *C23C 2/06* (2013.01); *C23C 2/28* (2013.01); *C23C 2/40* (2013.01); *C23C 28/025* (2013.01); *C23C 30/00* (2013.01); *C23C 30/005* (2013.01); *C21D 2211/001* (2013.01); *C21D 2211/002* (2013.01); *C21D 2211/005* (2013.01); *C21D 2211/008* (2013.01); *Y10T 428/12611* (2015.01); *Y10T 428/12618* (2015.01); *Y10T 428/12667* (2015.01); *Y10T 428/12799* (2015.01); *Y10T 428/12951* (2015.01); *Y10T 428/12958* (2015.01); *Y10T 428/12965* (2015.01); *Y10T 428/12972* (2015.01); *Y10T 428/2495* (2015.01); *Y10T 428/24967* (2015.01); *Y10T 428/263* (2015.01); *Y10T 428/264* (2015.01); *Y10T 428/265* (2015.01)

(56) References Cited

U.S. PATENT DOCUMENTS

| | | |
|---|---|---|
| 2012/0040203 A1 | 2/2012 | Takagi et al. |
| 2013/0295410 A1 | 11/2013 | Takahashi et al. |
| 2014/0234657 A1 | 8/2014 | Azuma et al. |
| 2014/0377582 A1 | 12/2014 | Azuma et al. |
| 2016/0060723 A1* | 3/2016 | Yamazaki ............... C22C 38/14 148/602 |
| 2016/0108492 A1 | 4/2016 | Zhong et al. |
| 2016/0160335 A1 | 6/2016 | Ikeda |
| 2016/0194744 A1 | 7/2016 | Miyata et al. |
| 2017/0051378 A1 | 2/2017 | Lee et al. |

FOREIGN PATENT DOCUMENTS

| | | |
|---|---|---|
| EP | 2921569 | 9/2015 |
| JP | 2002080931 | 3/2002 |
| JP | 2013221198 | 10/2013 |
| JP | 5672745 | 2/2015 |
| KR | 100786052 | 12/2007 |
| KR | 20090006881 | 1/2009 |
| KR | 20100030627 | 3/2010 |
| KR | 20130086062 | 7/2013 |
| KR | 20140081622 | 7/2014 |
| KR | 20140131203 | 11/2014 |
| KR | 20150130612 | 11/2015 |
| WO | 2010126161 | 11/2010 |
| WO | 2013047820 | 4/2013 |
| WO | 2013118679 | 8/2013 |
| WO | WO 2014/171057 | * 10/2014 |
| WO | 2015001367 | 1/2015 |
| WO | 2015005191 | 1/2015 |
| WO | 2015022778 | 2/2015 |
| WO | 2015174605 | 11/2015 |

OTHER PUBLICATIONS

Japanese Office Action—Japanese Application No. 2018-530902 dated Jul. 23, 2019, citing WO2013/118679, JP2013-221198, WO2013/047820, WO2015/005191 and WO2015/022778.

European Search Report—European Application No. 16876006.4 dated Oct. 22, 2018, citing EP 2 921 569, WO 2015/022778, JP 5 672745, KR 100 786 052 and WO 2015/001367.

International Search Report—PCT/KR2016/014607 dated Mar. 9, 2017.

* cited by examiner

HIGH-STRENGTH HOT-DIP GALVANIZED STEEL SHEET HAVING EXCELLENT SURFACE QUALITY AND SPOT WELDABILITY

TECHNICAL FIELD

The present disclosure relates to a hot-dip galvanized steel sheet for members such as structural automotive frame members, and more particularly, to a high-strength hot-dip galvanized steel sheet having good surface quality and spot weldability and a method for manufacturing the high-strength hot-dip galvanized steel sheet.

BACKGROUND ART

In recent years, high-strength steel sheets have been consistently required for automobiles, so as to reduce the weight of automobiles, in accordance with regulations on carbon dioxide emission for protecting the environment, and to improve safety performance, such as crash safety.

To satisfy these requirements, high-strength steel sheets having a tensile strength of 900 MPa or greater have been recently developed and applied to automobiles.

Adding greater amounts of strength enhancing elements such as carbon (C) is a method of increasing the strength of steel sheets, and steel sheets having improved strength may be easily manufactured by the method.

However, automotive steel sheets, particularly, steel sheets for automotive frames, are required to undergo frame forming processes without defects such as cracks, and thus it is necessary to guarantee elongation in addition to improving strength.

Thus, elements such as manganese (Mn), silicon (Si), aluminum (Al), chromium (Cr), or titanium (Ti) are usually added to guarantee both the strength and elongation of steel sheets, and steel sheets having high strength and elongation may be manufactured by properly adjusting the contents of such elements and manufacturing conditions.

In addition, automotive steel sheets are required to have corrosion resistance for long automobile lifespans, and to this end, hot-dip galvanized steel sheets plated with molten zinc are used. Hot-dip galvanized steel sheets may be manufactured through a plating process in which a steel sheet annealed in a continuous annealing furnace is dipped into a plating bath.

In the case of a high-strength steel sheet for automobiles having a tensile strength of 900 MPa or greater, elements such as silicon (Si), manganese (Mn), or aluminum (Al) are added to steel to guarantee target strength and ductility. However, since these elements are easily oxidable elements, when the steel sheet is annealed, the elements react with even a small amount of oxygen or steam contained in an annealing furnace and form oxides of silicon (Si), manganese (Mn), or aluminum (Al), or complex oxides thereof, thereby lowering the wettability of the steel sheet with zinc (Zn) in a subsequent galvanizing process, causing plating failures locally or entirely on the steel sheet in the galvanizing process, and lowering the plating surface quality of the steel sheet.

In addition, when a high-strength galvanized steel sheet is spot welded, the high-strength galvanized steel sheet is expanded and contracted as being heated and cooled, and thus tensile stress may occur locally. Then, molten zinc may permeate into steel of the high-strength galvanized steel sheet along grain boundaries, and thus a liquid metal embrittlement (LME) phenomenon causing brittle cracks may occur. LME occurs much more in a heat affected zone than in a fusion zone during a spot welding process and markedly decreases post-welding strength.

If base steel sheets of galvanized steel sheets are high-strength steel sheets having high contents of elements such as silicon (Si), manganese (Mn), or aluminum (Al), LME occurs much more in the galvanized steel sheets. The reason for this is as follows. High-strength steel sheets are multiphase steel sheets having phases such as ferrite, bainite, martensite, or austenite, and if a galvanized multiphase steel sheet is spot welded, a surface zinc plating layer is melted because of a temperature increase during the welding process and permeates into steel of the galvanized multiphase steel sheet along grain boundaries, thereby causing LME. In particular, if ferrite and austenite coexist in the microstructure of a surface layer region of a base steel sheet, since grain boundary energy is much larger than grain boundary energy of ferrite and austenite, the permeation of molten zinc through the grain boundaries of ferrite and austenite occurs much more and LME occurs severely.

In addition, if LME occurs in a weld zone of a material, the rigidity of the material markedly decreases.

Therefore, it is necessary to guarantee surface plating quality and reduce LME in a weld zone so as to use high-strength hot-dip galvanized steel sheets as automotive steel sheets.

In the related art, the following techniques have been proposed to improve the plating quality of high-strength steel sheets.

In Patent Document 1, plating quality is improved by performing: a process of forming iron (Fe) oxides including oxides of Si, Mn, or Al, or complex oxides thereof in a steel sheet to a certain depth by oxidizing the steel sheet in an oxidizing atmosphere of a direct flame furnace while annealing the steel sheet at an air-fuel ratio of 0.80 to 0.95; a process of annealing and reducing the steel sheet in a reducing atmosphere to reduce the Fe oxides; and a process of hot-dip galvanizing the steel sheet.

If such an oxidizing and reducing method is applied to an annealing process, elements having high affinity with oxygen are internally oxidized in a region of a steel sheet ranging from a surface to a position at a certain depth and are thus prevented from diffusing to a surface layer of the steel sheet, and thus the formation of oxides of the elements is relatively suppressed in the surface layer. Therefore, wettability of the steel sheet with zinc of a plating bath is improved, and thus plating failures may be reduced.

However, although the platability of a high-strength steel sheet is improved by the oxidizing and reducing method, when the high-strength steel sheet is formed into a structural member and spot welded for assembly, there is a limit to suppressing LME.

According to another platability improving technique disclosed in Patent Document 2, the dew point in an annealing furnace is maintained at a high level to internally oxidize easily oxidable elements such as Mn, Si, or Al inside steel and thus to reduce the amounts of external oxides formed on the surface of a steel sheet after annealing.

If oxidable elements are internally oxidized by the above-described technique, external oxidation reduces, and thus platability improves. However, since a base steel sheet includes austenite, permeation of molten zinc through grain boundaries of ferrite and austenite increases during a spot welding process, thereby causing LME.

(Patent Document 1) Korean Patent Application Laid-open Publication No. 2010-0030627
(Patent Document 2) Korean Patent Application Laid-open Publication No. 2009-0006881

DISCLOSURE

Technical Problem

Aspects of the present disclosure may provide a high-strength hot-dip galvanized steel sheet suitable for structural automotive frame members and having high plating surface quality and high weldability owing to the suppression of liquid metal embrittlement (LME) during spot welding, and a method for manufacturing the high-strength hot-dip galvanized steel sheet.

Technical Solution

According to an aspect of the present disclosure, a high-strength hot-dip galvanized steel sheet having good surface quality and spot weldability may include a base steel sheet and a zinc plating layer formed on a surface of the base steel sheet,
wherein the base steel sheet may include, by wt %, carbon (C): 0.1% to 0.3%, silicon (Si): 0.5% to 2.5%, manganese (Mn): 2.0% to 8.0%, soluble aluminum (sol.Al): 0.001% to 0.5%, phosphorus (P): 0.04% or less (excluding 0%), sulfur (S): 0.015% or less (excluding 0%), nitrogen (N): 0.02% or less (excluding 0%), chromium (Cr): 0.01% to 0.7%, titanium (Ti): (48/14)*[N] % to 0.1%, and a balance of iron (Fe) and inevitable impurities,
wherein the base steel sheet may have a microstructure including ferrite in an area fraction of 5% to 30%, austenite in an area fraction of 5% to 20%, bainite and martensite in an area fraction of 50% to 80%, and precipitates in an area fraction of 2% or less (including 0%), wherein in a region of the base steel sheet from the surface to a 2-μm position in a thickness direction of the base steel sheet, the base steel sheet may have a microstructure including ferrite in an area fraction of 50% or greater, austenite in an area fraction of 2% or less (including 0%), bainite and martensite in an area fraction of 50% or less (including 0%), and precipitates in an area fraction of 2% or less (including 0%).

According to another aspect of the present disclosure, a method for manufacturing a high-strength hot-dip galvanized steel sheet having good surface quality and spot weldability may include: reheating a steel slab having the above-described composition to a temperature within a range of 1100° C. to 1300° C.; finish hot rolling the reheated steel slab at an Ar3 transformation point or greater so as to manufacture a hot-rolled steel sheet; coiling the hot-rolled steel sheet at a temperature of 700° C. or less; after pickling the coiled hot-rolled steel sheet, cold rolling the hot-rolled steel sheet to manufacture a cold-rolled steel sheet; performing a primary recrystallization annealing process on the cold-rolled steel sheet at a temperature of 750° C. to 950° C. for 5 seconds to 120 seconds in an annealing furnace adjusted to have a gas atmosphere including 3% to 70% $H_2$ and a balance of $N_2$ and a dew point of −40° C. to −20° C.; performing a secondary recrystallization annealing process on the cold-rolled steel sheet at a temperature of 700° C. to 950° C. for 5 seconds to 120 seconds in the annealing furnace adjusted to have a gas atmosphere including 3% to 70% $H_2$ and a balance of $N_2$ and a dew point of −20° C. to 5° C.; after the secondary recrystallization annealing process, cooling the cold-rolled steel sheet to a temperature of 200° C. to 400° C.; and maintaining the cooled cold-rolled steel sheet, reheating the cold-rolled steel sheet or re-cooling the cold-rolled steel sheet to a temperature of 450° C. to 500° C., and then dipping the cold-rolled steel sheet into a galvanizing bath so as to manufacture a hot-dip galvanized steel sheet.

Advantageous Effects

According to the present disclosure, the microstructure of a base steel of a plated steel sheet is controlled in a surface region and an internal region by optimizing contents of alloying elements and manufacturing conditions, thereby providing a high-strength hot-dip galvanized steel sheet having a degree of strength and ductility suitable for structural automotive frame members.

In addition, since liquid metal embrittlement (LME) is effectively suppressed in the high-strength hot-dip galvanized steel sheet of the present disclosure during spot welding, the high-strength hot-dip galvanized steel sheet may have high spot weldability and good surface quality.

DESCRIPTION OF DRAWINGS

Best Mode

The inventors have conducted in-depth research into a method for providing a high-strength steel sheet having mechanical properties suitable for structural members of automotive frames while preventing surface quality deterioration caused by defects such as plating failure during plating and spot weldability deterioration caused by liquid metal embrittlement (LME).

As a result, the inventors have found that a base steel sheet having a microstructure capable of preventing defects such as plating failures during a plating process and problems such as LME during a welding process could be provided by optimizing the composition and manufacturing conditions of the base steel sheet, and a high-strength hot-dip galvanized steel sheet having intended surface quality and high spot weldability could be provided by galvanizing the base steel sheet.

Embodiments of the present disclosure will now be described in detail.

According to an aspect of the present disclosure, a high-strength hot-dip galvanized steel sheet includes a base steel sheet and a zinc plating layer formed on a surface of the base steel sheet, wherein the base steel sheet may preferably include, by wt %, carbon (C): 0.1% to 0.3%, silicon (Si): 0.5% to 2.5%, manganese (Mn): 2.0% to 8.0%, soluble aluminum (sol.Al): 0.001% to 0.5%, phosphorus (P): 0.04% or less (excluding 0%), sulfur (S): 0.015% or less (excluding 0%), nitrogen (N): 0.02% or less (excluding 0%), chromium (Cr): 0.01% to 0.7%, and titanium (Ti): (48/14)*[N] % to 0.1%.

In the following description, reasons for adjusting the composition of the base steel sheet as described above will be described in detail. In the following description, the content of each element is given in wt % unless otherwise specified.

C: 0.1% to 0.3%

Carbon (C) is a key element for guaranteeing the strength of steel, and it may be preferable that the content of carbon (C) be within the range of 0.1% or greater for guaranteeing sufficient strength. However, if the content of carbon (C) is greater than 0.3%, bendability and weldability decrease together with ductility, thereby resulting in poor press formability and roll workability.

Si: 0.5% to 2.5%

Silicon (Si) is an element effective in improving the yield strength of steel and also stabilizing ferrite and retained austenite at room temperature. In addition, silicon (Si) suppresses precipitation of cementite during cooling from austenite and markedly prevents growth of carbides, thereby contributing to stabilizing a sufficient amount of retained austenite in transformation induced plasticity (TRIP) steel.

In addition, silicon (Si) is a key element for guaranteeing a tensile strength of 900 MPa or greater and high ductility intended in the present disclosure, and to obtain these effects, it may be preferable that the content of silicon (Si) be within the range of 0.5% or greater. However, if the content of silicon (Si) is excessively high, hot rolling load increases to cause hot rolling cracks, and the amount of surface concentrated silicon (Si) increases after an annealing process to cause poor platability. Therefore, according to the present disclosure, it may be preferable that the upper limit of the content of silicon (Si) be 2.5%.

Mn: 2.0% to 8.0%

Manganese (Mn) is known as a hardenability improving element that suppresses the formation of ferrite and stabilizes austenite. In addition, manganese (Mn) is a key element for improving the strength of steel, and manganese (Mn) may preferably be added in an amount of 2.0% or greater to guarantee a degree of tensile strength intended in the present disclosure. As the content of manganese (Mn) increases, strength is easily guaranteed, but platability may be poor due to an increase in the amount of surface oxides of manganese (Mn) during an annealing process. Therefore, according to the present disclosure, it may be preferable that the upper limit of the content of manganese (Mn) be 8.0%.

Sol.Al: 0.001% to 0.5%

Soluble aluminum (sol.Al) is added for deoxidation in steel making processes and is a carbonitride forming element. In addition, aluminum (Al) is an element extending a ferrite region and having an effect of decreasing annealing costs by lowering an Ac1 transformation point. To this end, it may be preferable that the content of sol.Al be 0.001% or greater. However, if the content of sol.Al is greater than 0.5%, weldability deteriorates, and the amount of surface oxides of aluminum (Al) also increases during an annealing process, making it difficult to guarantee platability.

P: 0.04% or Less (Excluding 0%)

Phosphorus (P) is an impurity included in steel, and if the content of phosphorus (P) is greater than 0.04%, weldability deteriorates, the risk of embrittlement of steel increases, and the possibility of dent defects increases. Therefore, it may be preferable that the upper limit of the content of phosphorus (P) be adjusted to be 0.04%.

S: 0.015% or Less (Excluding 0%)

Like phosphorus (P), sulfur (S) is an impurity included in steel and lowers the ductility and weldability of the steel. If the content of sulfur (S) is greater than 0.015%, the ductility and weldability of the steel are likely to decrease, and thus it may be preferable that the content of sulfur (S) be adjusted to be 0.015% or less.

N: 0.02% or Less (Excluding 0%)

Nitrogen (N) is a nitride forming element, and if the content of nitrogen (N) is greater than 0.02%, the risk of cracking during a continuous casting process markedly increases because of the formation of AlN. Thus, it may be preferable that the upper limit of the content of nitrogen (N) be adjusted to be 0.02%.

Cr: 0.01% to 0.7%

Chromium (Cr) is a hardenability increasing element and has an effect of suppressing the formation of ferrite. In particular, according to the present disclosure, it may be preferable that chromium (Cr) be added in an amount of 0.01% or greater so as to suppress the formation of ferrite and thus to guarantee a certain fraction of retained austenite as described above. However, if the content of chromium (Cr) is greater than 0.7%, production costs may undesirably increase due to excessive alloying element addition.

Ti: (48/14)*[N] % to 0.1%

Titanium (Ti) is a nitride forming element which has an effect of decreasing the content of nitrogen (N) in steel. To this end, titanium (Ti) is added in an amount of (48/14)*[N (wt %)] or greater based on a chemical equivalent thereof. If titanium (Ti) is not added, cracks may be formed during a continuous casting process because of the formation of AlN, and if the content of titanium (Ti) is excessively high, greater than 0.1%, the content of carbon in martensite and the strength may decrease because of removal of dissolved nitrogen (N) and additional precipitation of carbides.

In addition to the above-described elements, the base steel sheet may further include the following elements to improve mechanical properties of the base steel sheet as in tended in the present disclosure. In this case, the base steel sheet may include only one of the following elements or two or more of the following elements.

Mo: 0.1% or Less (Including 0%)

Like chromium (Cr), molybdenum (Mo) markedly contributes to strength improvements of steel. Molybdenum (Mo) is an element effective in guaranteeing strength without lowering wettability with molten zinc. However, if the content of molybdenum (Mo) is excessively high, if is economically not favored. Thus, it may be preferable that the content of molybdenum (Mo) be 0.1% or less.

Sb: 0.05% or Less (Including 0%)

Antimony (Sb) is an element effective in improving plating surface quality, and when added to the base steel sheet, antimony (Sb) is concentrated in a surface region of the base steel sheet and thus relatively prevents diffusion of elements such as silicon (Si), manganese (Mn), aluminum (Al) to the surface region, thereby improving platability. However, if the content of antimony (Sb) is greater than 0.05%, the brittleness of the base steel sheet may increase, and thus the elongation of the base steel sheet may decrease. Thus, it may be preferable that the content of antimony (Sb) be within the range of 0.05% or less.

Nb: 0.1% or Less (Including 0%)

Niobium (Nb) is effective in improving strength because niobium (Nb) segregates in the form of carbides in the austenite grain boundaries and prevents austenite grain coarsening during an annealing heat treatment. However, if the content of niobium (Nb) is greater than 0.1%, manufacturing costs markedly increase. Thus, it may be preferable that the content of niobium (Nb) be within the range of 0.1% or less.

B: 0.005% or Less (Including 0%)

Boron (B) may be added to guarantee the strength of steel. However, if the content of boron (B) is greater than 0.005%, boron (B) may concentrate in a surface region during an annealing process and may thus markedly decrease platability. Therefore, according to the present disclosure, it may be preferable that the content of boron (B) be within the range of 0.005% or less.

The other component of the base steel sheet of the present disclosure is iron (Fe). However, impurities of raw materials or manufacturing environments may be inevitably included in the base steel sheet, and such impurities may not be removed from the base steel sheet. Such impurities are well-known to those of ordinary skill in manufacturing industries, and thus specific descriptions of the impurities will not be provided in the present disclosure.

Preferably, the base steel sheet having the above-described composition of the present disclosure may have a microstructure including, ferrite in an area fraction of 5% to 30%, austenite in an area fraction of 5% to 20%, bainite and martensite in an area fraction of 50% to 80%, and precipitates in an area fraction of 2% or less (including 0%).

Both the strength and ductility of the base steel sheet may be guaranteed by properly adjusting the fractions of soft and hard phases as described above, and post-machining strength of the base steel sheet may be markedly improved owing to austenite.

However, if the base steel sheet has the microstructure throughout the entire thickness thereof, when a spot welding process is performed after a galvanizing process, liquid-phase zinc may easily permeate into interfaces between different phases having high interfacial energy, that is, into interfaces between ferrite, austenite, bainite, and martensite, thereby causing LME.

Therefore, in the present disclosure, the microstructure of the base steel sheet in a surface layer region may be adjusted to have ferrite as a primary phase.

More specifically, in a region from a surface to a 2-μm position in the thickness direction of the base steel sheet, preferably, the base steel sheet may have a microstructure including ferrite in an area fraction of 50% or greater, austenite in an area fraction of 2% or less (including 0%), bainite and martensite in an area fraction of 50% or less (including 0%), and precipitates in an area fraction of 2% or less (including 0%), and more preferably a microstructure including a ferrite single phase.

Since the surface layer region of the base steel sheet is formed of a soft phase as described above, LME may be effectively suppressed in a later spot welding process.

In addition, the base steel sheet may include at least two internal oxides selected from Si oxides, Mn oxides, Al oxides, and Cr oxides in a region from the surface to a 5-μm position in the thickness direction of the base steel sheet, so as to improve plating quality by suppressing surface oxidation of in-steel oxidable elements (such as Si, Mn, and Al) during an annealing process.

The oxidable elements may form internal oxides, and thus diffusion of the oxidable elements to a surface region may be prevented.

The base steel sheet of the present disclosure satisfying the above-described composition and microstructure may be processed through manufacturing processes (described later) to manufacture a hot-dip galvanized steel sheet, and the hot-dip galvanized steel sheet of the present disclosure may have a tensile strength of 900 MPa or greater and the value of tensile strength (MPa)×elongation (%) within the range of 16000 MPa % or greater.

Hereinafter, a method for manufacturing a high-strength hot-dip galvanized steel sheet will be described in detail according to another aspect of the present disclosure.

In short, the high-strength hot-dip galvanized steel sheet may be manufactured by preparing a steel slab having the above-described composition and processing the steel slab through [reheating, hot rolling, cold rolling, annealing, and galvanizing processes].

Reheating Process

First, the steel slab having the above-described composition is reheated to a given temperature range.

In this case, preferably, the reheating temperature range may be from 1100° C. to 1300° C. If the reheating temperature range is less than 1100° C., a hot rolling load may markedly increase, and if the reheating temperature range is greater than 1300° C., reheating costs may increase and surface scale may undesirably increase.

Hot Rolling Process

The steel slab reheated as described above may be subjected to a finish hot rolling process to manufacture a hot-rolled steel sheet.

In this case, the finish rolling temperature of the finish hot rolling process may preferably be an Ar3 transformation point or greater. If the finish rolling temperature is less than an Ar3 transformation point, rolling may occur in a dual phase region of ferrite+austenite or in a ferrite region to result in a mixed grain structure, and abnormal operations may occur due to hot rolling load variations.

Coiling Process

The hot-rolled steel sheet manufactured as described above may be coiled.

In this case, the coiling process may preferably be performed at a temperature of 700° C. or less, and more preferably at a temperature of 400° C. to 700° C.

If the coiling temperature is greater than 700° C., an oxide layer may be excessively formed on a surface of the hot-rolled steel sheet, resulting in defects. Conversely, if the coiling temperature is less than 400° C., the strength of the hot-rolled steel sheet may excessively increase, and thus large load may be applied to rolling rolls in a subsequent cold rolling process.

Cold Rolling Process

The coiled hot-rolled steel sheet may be pickled and cold rolled to manufacture a cold-rolled steel sheet.

The reduction ratio of the cold rolling process is not particularly limited. However, the reduction ratio may be 60% or less by taking factors such as rolling loads into consideration.

Annealing Process

The cold-rolled steel sheet manufactured as described above is inserted into an annealing furnace, and an annealing heat treatment may be performed on the cold-rolled steel sheet.

According to the present disclosure, primary recrystallization annealing and secondary recrystallization annealing may be performed as described below, so as to form the above-described soft-phase microstructure, that is, the soft-phase microstructure in the surface layer region of the base steel sheet, and to prevent diffusion of oxidable elements to a surface region by forming internal oxides.

Primary Recrystallization Annealing

Preferably, the primary recrystallization annealing may be performed at a temperature of 750° C. to 950° C. in the annealing furnace adjusted to have a gas atmosphere including 3% to 70% $H_2$ and the balance of $N_2$ and a dew point of −40° C. to −20° C.

If the dew point in the primary recrystallization annealing is less than −40° C., oxides having a high Si content are formed on the surface of the steel sheet, and although the atmosphere of the annealing furnace is controlled in the subsequent secondary recrystallization annealing, the oxides having a high Si content remain on the surface of the steel sheet, thereby lowering platability. Conversely, if the dew point is greater than −20° C., internal oxides of Si, Mn, Al, or Cr are formed in steel existing immediately below the surface layer region of the base steel sheet, and the internal oxides may hinder the formation of ferrite in the surface layer region during the secondary recrystallization annealing. Therefore, the surface layer region may not have the microstructure intended in the present disclosure.

Therefore, according to the present disclosure, it may be preferable that the dew point in the primary recrystallization annealing be within the range of −40° C. to −20° C., and then oxides of Mn may be mainly formed on the surface of the steel sheet after final annealing, thereby guaranteeing platability. In addition, since internal oxides are not formed, the surface layer region of the base steel sheet may have the intended soft-phase microstructure after the secondary recrystallization annealing and a galvanizing process, and thus spot weldability may be improved.

In addition, the gas atmosphere in the primary recrystallization annealing may be adjusted to have a hydrogen content preferably within the range of 3% to 70% in volume %. If the hydrogen content in the gas atmosphere is less than 3%, iron oxides existing on the surface of the steel sheet may be insufficiently reduced. Conversely, if the hydrogen content in the gas atmosphere is greater than 70%, iron oxides existing on the surface of the steel sheet may be sufficiently reduced. However, due to economical aspects, it may be preferable that the hydrogen content in the gas atmosphere be adjusted to be within the range of 70% or less, and more preferably within the range of 30% or less.

In addition, when the annealing temperature is adjusted to be 750° C. or greater, recrystallization occurs sufficiently. However, if the annealing temperature is greater than 950° C., the lifespan of the annealing furnace decreases.

In addition, preferably, the duration of annealing may be adjusted to be equal to or greater than 5 seconds to obtain a uniform recrystallized structure but may be adjusted to be equal to or less than 120 seconds because of economical aspects.

Secondary Recrystallization Annealing

After the primary recrystallization annealing, the cold-rolled steel sheet is cooled to room temperature and reinserted into the annealing furnace to perform secondary recrystallization annealing.

Preferably, the secondary recrystallization annealing may be performed at a temperature of 700° C. to 950° C. in the annealing furnace adjusted to have a gas atmosphere including 3% to 70% $H_2$ and the balance of $N_2$ and a dew point of −20° C. to 5° C.

In the secondary recrystallization annealing, the dew point in the annealing furnace may preferably be adjusted to be within the range of −20° C. to 5° C. so as to internally oxidize in-steel elements having high oxygen affinity such as Si, Mn, Al, or Cr while preventing the in-steel elements from diffusing to a surface region and forming surface oxides.

In this case, if the dew point is less than −20° C., these elements may diffuse to a surface region and undergo oxidation, thereby forming surface oxides and lowering platability. Although the dew point is greater than 5° C., the elements may be internally oxidized without significant difficulty. However, the thickness of internal oxides may excessively increase, and thus properties of the cold-rolled steel sheet may deteriorate.

As described above, if the dew point in the annealing furnace is maintained within the range of −20° C. to 5° C. during the secondary recrystallization annealing, decarbonization occurs in the surface together with internal oxidation, thereby effectively increasing the fraction of ferrite in the surface layer region.

In addition, the gas atmosphere in the secondary recrystallization annealing may be adjusted to have a hydrogen content preferably within the range of 3% to 70% in volume %. If the hydrogen content in the gas atmosphere is less than 3%, iron oxides existing on the surface of the steel sheet may be insufficiently reduced. Conversely, if the hydrogen content in the gas atmosphere is greater than 70%, iron oxides existing on the surface of the steel sheet may be sufficiently reduced. However, due to economical aspects, it may be preferable that the hydrogen content in the gas atmosphere be adjusted to be within the range of 70% or less.

In addition, when the annealing temperature is adjusted to be 700° C. or greater, recrystallization may sufficiently occur, and thus an intended structure and material quality may be obtained. However, if the annealing temperature is greater than 950° C., the lifespan of the annealing furnace may decrease.

In addition, preferably, the duration of annealing may be adjusted to be equal to or greater than 5 seconds to obtain a uniform recrystallized structure but may be adjusted to be equal to or less than 120 seconds because of economical aspects.

Cooling Process

After the above-described primary and secondary recrystallization annealing processes, the cold-rolled steel sheet may be cooled to a given temperature.

In this case, the cooling process may preferably be stopped within a temperature within a range of 200° C. to 400° C. If the cooling end temperature is less than 200° C., it is difficult to guarantee elongation because of an excessively high fraction of martensite, and if the cooling end temperature is greater than 400° C., sufficient strength and elongation are not guaranteed because the fractions of austenite and martensite decrease.

Preferably, the cooling process may be performed step by step (through primary and secondary cooling processes) at an average cooling rate of 5° C./s to 100° C./s, and the cooling rate in the secondary cooling process may be greater than the cooling rate in the primary cooling process.

The cooling process may be performed at an average cooling rate of 5° C./s or greater so as to suppress austenite-to-pearlite transformation in a dual phase region of ferrite and austenite or in an austenite single phase region on which the recrystallization annealing processes has been performed. However, if the average cooling rate is greater than 100° C./s, temperature variations in the width direction of the steel sheet increase due to rapid cooling, and thus the steel sheet may have a poor shape.

Galvanizing Process

The cold-rolled steel sheet cooled under the above-described conditions is dipped into a galvanizing bath to manufacture a hot-dip galvanized steel sheet.

In this case, the cold-rolled steel sheet may be re-cooled or reheated to a temperature of 450° C. to 500° C. and may be maintained at a temperature of 440° C. to 500° C. Then, the cold-rolled steel sheet may be dipped into the galvanizing bath having an Al content of 0.13% to 0.3% and the balance of zinc (Zn) and inevitable impurities, and after taking the cold-rolled steel sheet out of the galvanizing bath, the cold-rolled steel sheet may be adjusted in plating amount and cooled to manufacture a hot-dip galvanized steel sheet.

If the temperature of the galvanizing bath is less than 440° C., rolls inside the galvanizing bath may not be easily operated because the viscosity of zinc increases, and if the temperature of the galvanizing bath is greater than 500° C., the amount of vaporized zinc may increase.

In addition, if the Al content in the galvanizing bath is less than 0.13%, plating layer separation may be occurred because the formation of an Fe—Al alloy between the base steel sheet and a plating layer may be suppressed, and if the Al content in the galvanizing bath is greater than 0.3%, weldability may be lowered because the Al content in the plating layer increases.

According to the present disclosure, when the high-strength hot-dip galvanized steel sheet is manufactured through the above-described processes under the above-described conditions, the cold-rolled steel sheet manufactured through the cold rolling process may be pre-plated with at least one of Fe, Ni, Co, and Sn in a plating amount of 0.01 g/m² to 5.0 g/m² on each side after the primary recrystallization annealing before the secondary recrystallization annealing.

Owing to this pre-plating, the dew point in the subsequent annealing process may be effectively controlled.

The high-strength hot-dip galvanized steel sheet manufactured according to the present disclosure includes a zinc plating layer thereon, and the base steel sheet of the high-strength hot-dip galvanized steel sheet has a microstructure including ferrite in an area fraction of 5% to 30%, austenite in an area fraction of 5% to 20%, bainite and martensite in an area fraction of 50% to 80%, and precipitates in an area fraction of 2% or less (including 0%), wherein in a region from a surface to a 2-μm position in the thickness direction of the base steel sheet, the base steel sheet has a microstructure including ferrite in an area fraction of 50% or greater, austenite in an area fraction of 2% or less (including 0%), bainite and martensite in an area fraction of 50% or less (including 0%), and precipitates in an area fraction of 2% or less (including 0%).

Therefore, the high-strength hot-dip galvanized steel sheet of the present disclosure may have a tensile strength of 900 MPa or greater and the value of tensile strength (MPa)× elongation (%) within the range of 16000 MPa % or greater.

MODE FOR INVENTION

Hereinafter, the present disclosure will be described more specifically through examples. However, the following examples should be considered in a descriptive sense only and not for purpose of limitation. The scope of the present invention is defined by the appended claims, and modifications and variations reasonably made therefrom.

EXAMPLES

Steels having compositions shown in Table 1 below were melted to manufacture steel slabs. The steel slabs were maintained at 1200° C. for 1 hour and were then finish rolled at 900° C. to manufacture hot-rolled steel sheets. Thereafter, the hot-rolled steel sheets were cooled to 650° C. and maintained in a holding furnace at 650° C. for 1 hour, and then cooled in the holding furnace.

After the hot-rolled steel sheets were cooled, it was checked with the naked eye whether the hot-rolled steel sheets had hot-rolling cracks, and the hot-rolled steel sheets were pickled with 17-vol % HCl solution at 60° C. for 30 seconds to dissolve oxides formed on the surfaces of the hot-rolled steel sheets. After the pickling, the hot-rolled steel sheets were cold rolled with a reduction ratio of 50% to manufacture cold-rolled steel sheets.

Each of the cold-rolled steel sheets was pre-treated to remove foreign substances remaining on the surface of the cold-rolled steel sheet, and was then processed through a primary recrystallization annealing process under the conditions shown in Table 2 below and was then cooled. During the primary recrystallization annealing process, the atmosphere gas in an annealing furnace was 5% $H_2$—$N_2$.

After the primary recrystallization annealing process, a secondary recrystallization annealing process and a hot-dip plating process were performed under the conditions shown in Table 2 below. At that time, the secondary recrystallization annealing process and the hot-dip plating process were performed using directly coupled type equipment, and during the secondary recrystallization annealing process, the atmosphere gas in the annealing furnace was 5% $H_2$—$N_2$. In addition, when the steel sheets were dipped into a plating bath after the secondary recrystallization annealing process, the temperature of the steel sheets was higher than the temperature of a plating bath by 10° C.

After the hot-dip plating process, the plating amount of the steel sheets was adjusted to be 60 g/m² on each side by using an air knife, and then the steel sheets were cooled, thereby manufacturing hot-dip galvanized steel sheets.

The surface quality of the hot-dip galvanized steel sheets was evaluated by observing the surface of each of the hot-dip galvanized steel sheets with the naked eye to check for non-plated portions and the degree of plating failure, and results thereof are shown in Table 3 below.

In addition, plating adhesion was evaluated by applying an adhesive for automotive structural members to the surface of each of the hot-dip galvanized steel sheets, drying the adhesive, bending the hot-dip galvanized steel sheet by 90°, and checking whether the hot-dip galvanized steel sheet flaked in the adhesive, and results thereof are shown in Table 3 below.

In addition, a tensile test was performed on each of the hot-dip galvanized steel sheets according to JIS 5 to measure the tensile strength and elongation of the hot-dip galvanized steel sheet and calculate the value of tensile strength (TS) [MPa]×elongation (El) [%], and results thereof are shown in Table 3 below.

Phase fractions in a surface layer region and an internal region of the base steel sheet of each of the hot-dip galvanized steel sheets were measured by electron backscatter diffraction (EBSD) and X-ray diffraction. At that time, the phase fractions in the surface layer region were measured by analyzing phases in a region ranging from a surface to a 0.3-μm position in the thickness direction of the base steel sheet, and the phase fractions in the internal region were measured by analyzing phases in a region ranging from the surface to a 10-μm position in the thickness direction of the base steel sheet. Results thereof are shown in Table 3.

In addition, a section of each of the hot-dip galvanized steel sheets was observed using a TEM to measure the composition of internal oxides of the base steel sheet and a depth to which the internal oxides were present from the surface of the base steel sheet, and results thereof are shown in Table 3 below.

In addition, weldability was evaluated by welding together two of the hot-dip galvanized steel sheets by a spot welding method, observing a section of the welded hot-dip galvanized steel sheets using an SEM to measure crack sizes in a heat affected zone, and recording the maximum crack size in each example as a liquid metal embrittlement (LME) crack size.

The spot welding was performed according to ISO 18278-2, and welding current was set to be lower than Zn expulsion current by 0.5 kA.

TABLE 1

| Steels | Composition (wt %) | | | | | | | | | | | | |
|---|---|---|---|---|---|---|---|---|---|---|---|---|---|
| | C | Si | Mn | P | S | sol. Al | Cr | Ti | N | B | Mo | Sb | Nb |
| A | 0.12 | 1.52 | 1.55 | 0.0100 | 0.0030 | 0.036 | 0.05 | 0.019 | 0.0036 | 0 | 0.04 | 0 | 0 |
| B | 0.16 | 1.55 | 2.7 | 0.0085 | 0.0027 | 0.50 | 0.40 | 0.019 | 0.0033 | 0.002 | 0 | 0 | 0 |
| C | 0.17 | 2.03 | 3.05 | 0.0100 | 0.0026 | 0.01 | 0.50 | 0.020 | 0.0037 | 0 | 0.05 | 0.02 | 0.010 |
| D | 0.14 | 3.5 | 4.11 | 0.0095 | 0.0030 | 0.50 | 0.20 | 0.008 | 0.0015 | 0 | 0.02 | 0 | 0 |
| E | 0.17 | 1.45 | 2.66 | 0.0100 | 0.0029 | 0.031 | 0.60 | 0.020 | 0.0040 | 0 | 0.06 | 0.05 | 0 |
| F | 0.25 | 1.59 | 5.58 | 0.0100 | 0.0026 | 0.11 | 0.15 | 0.020 | 0.0037 | 0.001 | 0 | 0.02 | 0 |
| G | 0.18 | 1.75 | 7.3 | 0.0150 | 0.0041 | 0.20 | 0.20 | 0.010 | 0.0025 | 0.002 | 0 | 0 | 0 |
| H | 0.18 | 1.65 | 13.5 | 0.0150 | 0.0045 | 0.015 | 0.20 | 0.008 | 0.0025 | 0.002 | 0 | 0 | 0.005 |

(Steel D was cracked during the hot rolling process, and thus subsequent processes were not performed on Steel D.)

TABLE 2

| | Primary recrystallization annealing | | | Secondary recrystallization annealing | | | Cooling | | Plating | Plating bath temp. (° C.) | Plating bath Al content (%) | |
|---|---|---|---|---|---|---|---|---|---|---|---|---|
| Steels | Dew point (° C.) | *AT (° C.) | **MT (s) | Dew point (° C.) | AT (° C.) | MT (s) | Temp. (° C.) | Average rate (° C./s) | Reheating temp. (° C.) | | | No. |
| A | −35 | 820 | 60 | −10 | 820 | 50 | 290 | 20 | 500 | 457 | 0.22 | ***CE1 |
| B | −35 | 820 | 45 | −5 | 850 | 45 | 300 | 28 | 500 | 456 | 0.18 | ****IE1 |
| | −35 | 860 | 60 | 0 | 820 | 45 | 300 | 15 | 500 | 456 | 0.21 | IE2 |
| C | −23 | 850 | 60 | 2 | 820 | 50 | 300 | 19 | 500 | 457 | 0.22 | IE3 |
| | −39 | 850 | 80 | −10 | 860 | 45 | 350 | 13 | 480 | 455 | 0.20 | IE4 |
| | −65 | 800 | 80 | −10 | 850 | 50 | 300 | 21 | 480 | 455 | 0.21 | CE2 |
| E | −33 | 820 | 56 | −2 | 850 | 50 | 310 | 17 | 480 | 455 | 0.24 | IE5 |
| | −25 | 850 | 80 | −10 | 850 | 48 | 330 | 45 | 480 | 455 | 0.16 | IE6 |
| | −35 | 820 | 42 | 5 | 850 | 55 | 290 | 26 | 480 | 456 | 0.20 | IE7 |
| | −5 | 800 | 80 | −10 | 850 | 48 | 330 | 45 | 480 | 455 | 0.16 | CE3 |
| | −35 | 820 | 42 | −55 | 850 | 55 | 290 | 26 | 480 | 456 | 0.20 | CE4 |
| | −35 | 860 | 34 | −15 | 680 | 55 | 300 | 31 | 480 | 470 | 0.23 | CE5 |
| F | −25 | 820 | 55 | −3 | 840 | 36 | 280 | 39 | 490 | 460 | 0.19 | IE8 |
| | −38 | 870 | 70 | 4 | 840 | 55 | 350 | 22 | 480 | 456 | 0.22 | IE9 |
| | −29 | 840 | 60 | 1 | 860 | 40 | 550 | 17 | 480 | 456 | 0.22 | CE6 |
| | −60 | 850 | 60 | −60 | 850 | 48 | 350 | 25 | 470 | 456 | 0.22 | CE7 |
| G | −30 | 850 | 50 | −1 | 840 | 56 | 300 | 22 | 470 | 456 | 0.21 | IE10 |
| | −37 | 850 | 70 | 4 | 800 | 60 | 300 | 16 | 470 | 456 | 0.23 | IE11 |
| | −31 | 840 | 60 | −9 | 850 | 60 | 250 | 10 | 470 | 456 | 0.23 | IE12 |
| H | −35 | 840 | 50 | −55 | 830 | 55 | 300 | 9 | 470 | 456 | 0.22 | CE8 |

*AT: Annealing Temperature,
**MT: Maintaining Temperature,
***CE: Comparative Example,
****IE: Inventive Example

TABLE 3

| No. | Tensile properties | | | Microstructure of surface layer region | | B + M + Precipitate (%) | Internal microstructure | | B + M + Precipitate (%) | Internal oxides Elements | Depth (μm) | LME crack size (μm) |
|---|---|---|---|---|---|---|---|---|---|---|---|---|
| | ***SQ | ****PA | TS (Mpa) | TS × El (MPa %) | F (%) | γ (%) | | F (%) | γ (%) | | | |
| *CE1 | ○ | ○ | 695 | 19332 | 71 | <1 | >28 | 15 | 8 | 77 | Mn, Si, Al | 0.8 | 67 |
| **IE1 | ○ | ○ | ≥900 | 21467 | 65 | <1 | >34 | 17 | 7 | 76 | Mn, Si, Al, Cr | 1.2 | 15 |
| IE2 | ○ | ○ | ≥900 | 22086 | 67 | <1 | >32 | 20 | 5 | 75 | Mn, Si, Al, Cr | 1.4 | 23 |
| IE3 | ○ | ○ | ≥900 | 22416 | 72 | <1 | >27 | 13 | 10 | 77 | Mn, Si, Cr | 2.8 | 33 |
| IE4 | ○ | ○ | ≥900 | 22098 | 73 | <1 | >26 | 12 | 9 | 79 | Mn, Si, Cr | 1.4 | 13 |

TABLE 3-continued

| | | | Tensile properties | | Microstructure of surface layer region | | | Internal microstructure | | | Internal oxides | | LME crack |
|---|---|---|---|---|---|---|---|---|---|---|---|---|---|
| | | | | | | | B + M + | | | B + M + | | | |
| No. | ***SQ | ****PA | TS (Mpa) | TS × El (MPa %) | F (%) | γ (%) | Precipitate (%) | F (%) | γ (%) | Precipitate (%) | Elements | Depth (μm) | size (μm) |
| CE2 | Δ | ○ | ≥900 | 22156 | 69 | <1 | >30 | 12 | 10 | 78 | Mn, Si, Cr | 1.3 | 32 |
| IE5 | ○ | ○ | ≥900 | 21375 | 70 | <1 | >29 | 15 | 8 | 77 | Mn, Si, Al, Cr | 1.1 | 26 |
| IE6 | ○ | ○ | ≥900 | 21036 | 71 | <1 | >28 | 14 | 8 | 78 | Mn, Si, Al, Cr | 0.9 | 28 |
| IE7 | ○ | ○ | ≥900 | 21886 | 69 | <1 | >30 | 14 | 11 | 75 | Mn, Si, Al, Cr | 1.7 | 22 |
| CE3 | ○ | ○ | ≥900 | 21088 | 36 | 5 | 59 | 14 | 8 | 78 | Mn, Si, Al, Cr | 1.0 | 188 |
| CE4 | x | x | ≥900 | 21934 | 14 | 8 | 78 | 15 | 11 | 74 | — | — | 460 |
| CE5 | ○ | ○ | ≥900 | 13122 | 81 | <1 | >18 | 75 | <1 | >24 | Mn, Si, Al, Cr | 0.8 | 18 |
| IE8 | ○ | ○ | ≥900 | 22630 | 69 | <1 | >30 | 8 | 12 | 80 | Mn, Si, Al, Cr | 1.2 | 22 |
| IE9 | ○ | ○ | ≥900 | 22033 | 73 | <1 | >26 | 8 | 11 | 81 | Mn, Si, Al, Cr | 1.8 | 10 |
| CE6 | ○ | ○ | ≥900 | 15333 | 72 | <1 | >27 | 9 | 1 | 90 | Mn, Si, Al, Cr | 1.6 | 17 |
| CE7 | x | x | ≥900 | 21980 | 11 | 6 | 83 | 9 | 12 | 79 | — | — | 737 |
| IE10 | ○ | ○ | ≥900 | 22311 | 68 | <1 | >31 | 7 | 11 | 82 | Mn, Si, Al, Cr | 1.9 | 42 |
| IE11 | ○ | ○ | ≥900 | 22406 | 66 | <1 | >33 | 9 | 10 | 81 | Mn, Si, Al, Cr | 2.9 | 36 |
| IE12 | ○ | ○ | ≥900 | 23126 | 67 | <1 | >32 | 7 | 12 | 81 | Mn, Si, Al, Cr | 1.6 | 35 |
| CE8 | x | x | ≥900 | 22156 | 10 | 8 | 82 | 7 | 18 | 75 | — | — | 612 |

*CE: Comparative Example,
**IE: Inventive Example,
***SQ: Surface quality,
****PA: Plating Adhesion
(Referring to Table 3 above, surface quality was evaluated as being ○: no plating failure, Δ: non-plated portions having a diameter of 1 mm or less, or x: non-plated portions having a diameter of greater than 2 mm, and plating adhesion was evaluated as being ○: no plating layer separation, and x: plating layer separation.)
(In Table 3, F denotes ferrite, γ denotes austenite, B denotes bainite, and M denotes martensite.)

As shown in Tables 1 to 3, each of Inventive Examples 1 to 12 satisfying the composition and manufacturing conditions proposed in the present disclosure had internal oxides of Mn, Si, Al, or Cr in a region from the surface to a 2.9-μm position in the thickness direction of the base steel sheet, and thus surface oxidation could be relatively suppressed. Thus, good plating surface quality and plating adhesion could be obtained.

In addition, each of Inventive Examples 1 to 12 has high tensile strength on the level of 900 MPa or greater, and the value of TS×El of each of Inventive Examples 1 to 12 was 16000 MPa % or greater. That is, the inventive examples had satisfactory material properties.

In particular, since the internal microstructure of the base steel sheet of each of Inventive Examples 1 to 12 had a fraction of austenite in addition to soft and hard phases, high strength and elongation could be obtained, and since the surface of the base steel sheet had ferrite as a main phase, the size of an LME crack resulting from the spot welding process was as small as intended: 67 μm or less.

However, Comparative Example 1 having a composition lacking manganese (Mn) did not have sufficient strength even though Comparative Example 1 had satisfactory plating surface quality, plating adhesion, and spot weldability owing to manufacturing conditions satisfying those proposed in the present disclosure.

In the case of Comparative Example 2 in which the dew point was less than −40° C. during the primary recrystallization annealing process, oxides having a high Si content were formed during the primary recrystallization annealing process.

Therefore, although the secondary recrystallization annealing process was performed on the Comparative Example 2 under conditions satisfying those proposed in the present disclosure, the platability of Comparative Example 2 was poor, and thus Comparative Example 2 had plating failure and poor surface quality.

In the case of Comparative Example 3 in which the dew point of the primary recrystallization annealing process was greater than −20° C., the formation of a ferrite layer in the surface layer region of the base steel sheet was suppressed because of internal oxides formed during the primary recrystallization annealing process. Thus, the fraction of ferrite in the microstructure of the surface layer region was low at 36%, and austenite was excessively formed. Therefore, the size of an LME crack after welding was 188 μm, that is, spot weldability was poor.

In the case of Comparative Example 4 in which the dew point of the furnace in the secondary recrystallization annealing process was less than −20° C., surface oxides such as oxides of Si, Mn, Al, or Cr were formed to thick thicknesses, resulting in poor plating surface quality and plating adhesion. In addition, the microstructure of the surface layer region of the base steel sheet did not satisfy conditions proposed in the present disclosure, and thus the size of an LME crack after welding was very large at 460 μm.

In the case of Comparative Example 5 in which the annealing temperature of the secondary recrystallization annealing process was low, the fraction of ferrite in the base steel sheet was excessively high, and the fraction of austenite was low, thereby resulting in poor material properties.

In the case of Comparative Example 6 in which the cooling temperature after the secondary recrystallization annealing process was excessively high, the fraction of austenite in the base steel sheet was low, and thus material properties of Comparative Example 6 were poor.

In the case of Comparative Example 7 in which the dew point in each of the primary and secondary recrystallization annealing processes was lower than the temperature ranges proposed in the present disclosure, elements such as Si, Mn, Al, or Cr diffused to a surface region and were externally oxidized, resulting in poor platability and plating adhesion. In addition, since the fraction of ferrite in the surface layer region was low and the fraction of austenite was high, the size of an LME crack after welding was 737 µm. That is, weldability was very poor.

In the case of Comparative Example 8 in which the content of manganese (Mn) was excessively high and the dew point of the annealing furnace in the secondary recrystallization annealing process was low, in-steel elements such as Mn, Si, or Cr diffused to a surface region and formed a thick surface oxide layer, thereby resulting in poor platability and plating adhesion. In addition, the fraction of ferrite in the surface layer region of the base steel sheet was low, and the fraction of austenite was high. Thus, the size of an LME crack after welding was 612 µm, that is, weldability was very poor.

The invention claimed is:

1. A high-strength hot-dip galvanized steel sheet having good surface quality and spot weldability, the high-strength hot-dip galvanized steel sheet comprising a base steel sheet and a zinc plating layer formed on a surface of the base steel sheet, wherein the base steel sheet comprises, by wt %, carbon (C): 0.1% to 0.3%, silicon (Si): 0.5% to 2.5%, manganese (Mn): 2.0% to 8.0%, soluble aluminum (sol.Al): 0.001% to 0.5%, phosphorus (P): 0.04% or less (excluding 0%), sulfur (S): 0.015% or less (excluding 0%), nitrogen (N): 0.02% or less (excluding 0%), chromium (Cr): 0.01% to 0.7%, titanium (Ti): (48/14)*[N] % to 0.1%, and a balance of iron (Fe) and inevitable impurities, wherein the base steel sheet has a microstructure comprising ferrite in an area fraction of 5% to 30%, austenite in an area fraction of 5% to 20%, bainite and martensite in an area fraction of 50% to 80%, and precipitates in an area fraction of 2% or less (including 0%), wherein in a region of the base steel sheet from the surface to a 2-µm position in a thickness direction of the base steel sheet, the base steel sheet has a microstructure comprising ferrite in an area fraction of 50% or greater, austenite in an area fraction of 2% or less (including 0%), bainite and martensite in an area fraction of 50% or less (including 0%), and precipitates in an area fraction of 2% or less (including 0%).

2. The high-strength hot-dip galvanized steel sheet claim 1, further comprising, by wt %, at least one selected from molybdenum (Mo): 0.1% or less (including 0%), antimony (Sb): 0.05% or less (including 0%), niobium (Nb): 0.1% or less (including 0%), and boron (B): 0.005% or less (including 0%).

3. The high-strength hot-dip galvanized steel sheet of claim 1, wherein the base steel sheet comprises at least two internal oxides selected from Si oxides, Mn oxides, Al oxides, and Cr oxides in a region from the surface to a 5-µm position in the thickness direction of the base steel sheet.

4. The high-strength hot-dip galvanized steel sheet of claim 1, wherein the high-strength hot-dip galvanized steel sheet has a tensile strength of 900 MPa or greater and a value of tensile strength (MPa)×elongation (%) within a range of 16000 MPa % or greater.

* * * * *